March 21, 1939. A. SERDOCK 2,151,305
MEASURING INSTRUMENT
Filed July 15, 1935
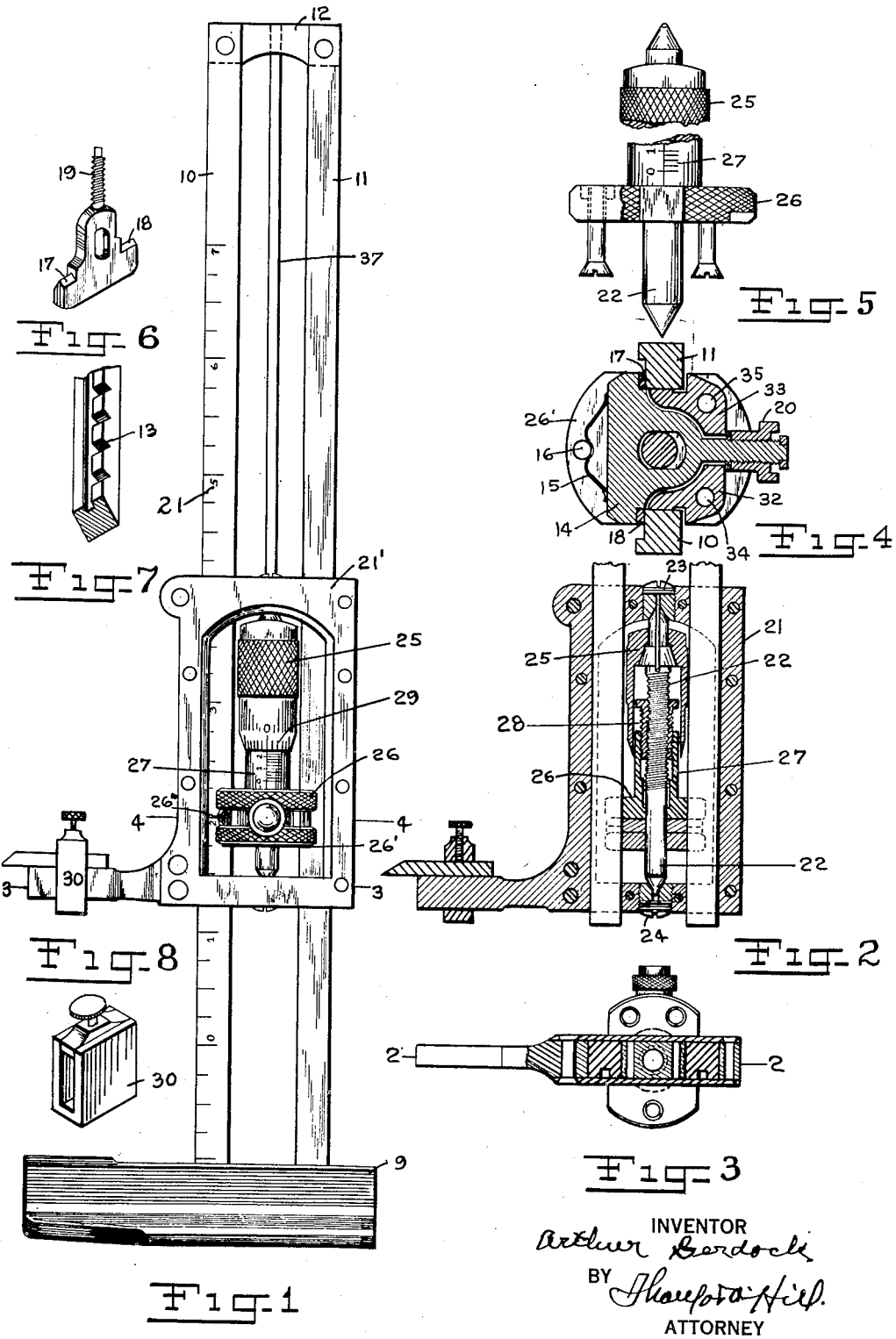
INVENTOR
Arthur Serdock
BY
ATTORNEY Patented Mar. 21, 1939

2,151,305

UNITED STATES PATENT OFFICE 2,151,305

MEASURING INSTRUMENT

Arthur Serdock, Bellmore, N. Y.

Application July 15, 1935, Serial No. 31,395

6 Claims. (Cl. 33—164)

My invention relates to improvements in measuring instruments, and more particularly has reference to and is illustrated in the accompanying drawing in its application to a caliper and micrometer, providing for an original approximate reading and a final reading of lesser units, with still finer sub-divisional readings.

Referring to the accompanying drawing, I have illustrated in Fig. 1 in vertical side elevation, a suitable form of caliper with micrometer embodying an application of my invention. Fig. 2 is a longitudinal detail, parts being in section and parts broken away, illustrating part of the internal mechanism. Fig. 3 is a view partly in cross section on the line 3—3 of Fig. 1. Fig. 4 is a cross-section on the line 4—4 of Fig. 1. Fig. 5 is an enlarged detail, parts broken away, showing parts of the measuring mechanism. Fig. 6, an engaging member for obtaining the initial measurement. Fig. 7, part of the main scale, engaged by the part shown in Fig. 6, and Fig. 8 is a perspective view of a suitable form of clamp.

9 indicates the base jaw of the device, and 10, 11, the frame thereof connected across one and by the bridge 12, the frame 10, 11 being V notched at the back at regularly spaced intervals as indicated at 13 in Fig. 7. Referring now to Fig. 4, it will be seen that an engaging member 14, shown to advantage in Fig. 6, is resiliently projected rightwardly by the spring 15, behind the pin 16. This causes the teeth 17, 18 to engage in the notches 13 of the frame 10, 11, and the shank of the engaging member is preferably threaded as indicated at 19, to engage the nut 20, so that in getting the initial measurement upon the scale 21, the engaging member 14 is held by turning down the nut 20 while the frame members 10, 11 are forced outwardly against the frame 21' by the pivoted levers or pawls 32, 33.

32, 33 are pawls pivotally mounted upon the pins 34, 35, one end of each of which is beneath the nut 20, and the other ends at the insides of the frame members 10, 11, so that when the nut 20 is turned down upon the inner ends of the pawls 32, 33, the outer ends tend to spread the frame members 10, 11 within the micrometer frame 21' hereinafter referred to, thus locking and holding the micrometer securely in adjusted position upon said frame 10, 11.

The micrometer frame 21' also carries additional mechanism consisting of a threaded pintle or pin 22, mounted in perforated nuts 23, 24, and is provided with a knurled nut 25, which rotates therewith, said pin carrying the indicator 26', reading upon scale 21, said indicator beneath member 26 having an internally threaded shank 27, engaging the internally and externally threaded nut 28, which rides upon the pin 22. The outside of the nut 25 is provided with a scale 29, and the same applies to the shank 27 as shown in Fig. 1, so that after the frame 21' has been moved along the scale 10, and has been held there as previously described, the knurled nut 25 may be turned and the member 26 moves upwardly or downwardly upon the pin 22, thus indicating a further measurement at 27, and a still further divisional measurement at 29, thus indicated in fractions of thousands, the measurement being taken, and making it possible by this arrangement to indicate at 27, 29, a reading of these fine measurements without the necessity of using a lens.

The nuts 23, 24 are preferably perforated as shown, to receive a drop of oil if desired, and a suitable clamp 30 may be used as indicated in Fig. 1 or of wider form as shown in Fig. 8.

37 indicates a rod attached to the slideable micrometer frame 21' as shown, having sliding bearing in the crosshead 12, which may be used as a depth gage or otherwise for measuring independently of the jaws.

Of course it will be understood that various modifications may be made in the construction and arrangement of parts without departing from the spirit of the invention as claimed.

I claim:

1. A measuring instrument of the character described comprising a main frame, a movable and a fixed jaw thereon, a scale on said main frame, means for adjusting said movable jaw thereon, a micrometer operatively mounted on said movable jaw, said main frame having notches at one side, resiliently projected means on said movable jaw at said side of said frame for engaging said notches, and means at the opposite side of said frame and jaw for disengaging said engaging means.

2. A measuring instrument of the character described having a notched main frame provided with a scale, fixed and movable jaws thereon, one of said jaws movable along said main frame having a frame portion, means for engaging said notches, a scale indicator, a micrometer pivotally engaged between the upper and lower parts of said jaw frame portion and adapted when operated to indicate the amount of movement of said jaw frame portion beyond the original movement thereof when engaging said notches.

3. A measuring instrument of the character described having a notched main frame provided with a scale, fixed and movable jaws thereon, one of said jaws movable along said main frame having a frame portion, means for engaging said notches, a scale indicator, a micrometer pivotally engaged between the upper and lower parts of said jaw frame portion and adapted when operated to indicate the amount of movement in said jaw frame portion beyond the original movement thereof when engaging said notches, said main frame extending within said jaw frame, the latter slidable upon said main frame, and means for spreading said main frame against said jaw frame.

4. A measuring instrument of the character described having a notched main frame provided with a scale, fixed and movable jaws thereon, one of said jaws movable along said main frame having a frame portion, means for engaging said notches, a scale indicator, a micrometer pivotally engaged between the upper and lower parts of said jaw frame portion and adapted when operated to indicate the amount of movement in said jaw frame portion beyond the original movement thereof when engaging said notches, and means for locking said main frame to said jaw frame.

5. A measuring instrument of character described having a notched scale, a sliding jaw thereon, a balanced micrometer mounted with its two ends between the upper and lower portions of said sliding jaw, said micrometer's both ends opposed by bearings, said micrometer having means for engaging and locking said movable jaw and stopping rotation of micrometer's pintle at a single point, and said micrometer having a scale indicator which centrally locates the engaging and locking member into the desired notch.

6. A measuring instrument of character described, having a notched scale, a sliding jaw thereon, a longitudinal slot on the scale extending from a point before first notch and ending at a point after the last notch, said slot providing rail raised slightly above cut-out surface upon which said sliding jaw rides, and said sliding jaw including a micrometer with means to engage the notches, lock the jaw and lock the micrometer's rotating pintle from a single point.

ARTHUR SERDOCK.